United States Patent Office  3,341,527
Patented Sept. 12, 1967

3,341,527
17β-TETRAHYDROFURANYLOXY ANDROSTANES
Alexander D. Cross, Mexico City, Mexico, assignor to Syntex Corporation, Panama, Panama, a corporation of Panama
No Drawing. Filed Feb. 16, 1965, Ser. No. 433,177
24 Claims. (Cl. 260—239.55)

This invention relates to novel cyclopentanophenanthrene derivatives and to processes for the preparation thereof.

The invention relates to novel 17β-tetrahydrofuranyloxy steroids of the androstane series of the formula

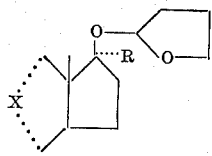

wherein R represents hydrogen, a lower alkyl group, such as methyl, ethyl, propyl and the like, a lower alkenyl group, such as vinyl and the like, or a lower alkynyl group, including halo-lower alkynyl wherein the halogen has an atomic number less than 53, such as ethynyl, fluoroethynyl, chloroethynyl, bromoethynyl, propynyl, trifluoropropynyl, butynyl, hexynyl and the like and X represents the A, B, and C rings of the androstane molecule.

Included among the novel 17β-tetrahydrofuranyloxy steroids of the present invention are those represented by the following formulas:

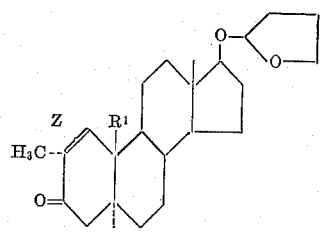

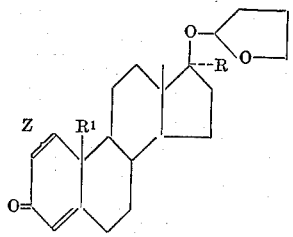

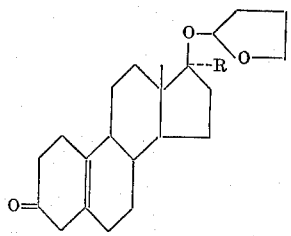

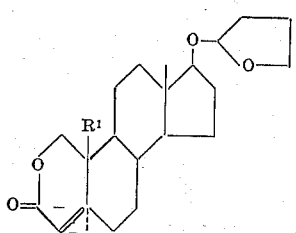

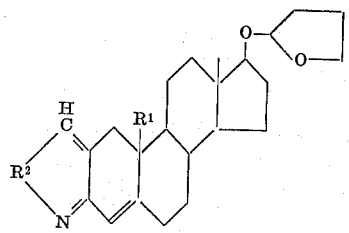

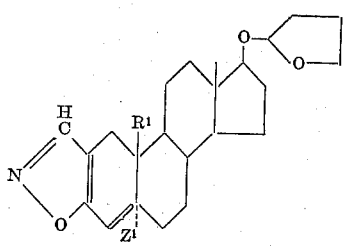

In the above formulas R has the same meaning as previously set forth; Z represents a double bond or saturated linkage between C–1 and C–2; $Z^1$ represents a double bond or saturated linkage between C–4 and C–5; $R^1$ represents hydrogen or methyl and when Z is a double bond, $R^1$ is methyl $R^2$ represents the oxygen or nitrogen linkage, i.e., —O— or

The novel 17β-tetrahydrofuranyloxy androstane derivatives of the present invention can also contain other conventional substituents, such as free hydroxyl groups, functionally converted hydroxyl groups, such as ester and ether groups, free keto groups, functionally converted keto groups, such as enol ether and ketal groups, lower alkyl groups, such as methyl, ethyl and propyl, lower alkylidene groups, such as methylene, ethylidene and propylidene, halogen atoms, such as fluorine, chlorine and bromine, amino groups, double bonds, and the like, which, depending on the particular substituent, can be present at one or more of positions 1 through 16, 18 and 19 on the steroid nucleus.

The novel 17β-tetrahydrofuranyloxy steroids of the present invention exhibit enhanced anabolic activity when administered orally. These novel 17β-tetrahydrofuranyloxy steroids also possess anti-estrogenic and anti-ovulatory activity, lower blood cholesterol levels, and inhibit the secretion of gonadotrophin by the pituitary gland.

The novel 17β-tetrahydrofuranyloxy steroids of the present invention are prepared by reacting corresponding 17β-hydroxy steroids, under substantially anhydrous conditions, with an excess of dihydrofuran prepared as described in U.S. Patent No. 2,556,325 to G. L. A. Fluchaire and G. Collardeau, e.g., from about 1 to about 2 or more molecular equivalents, for each hydroxyl group in the steroid starting material, in the presence of a small amount of an acidic catalyst, e.g., hydrochloric acid, p-toluenesulfonic acid, boron trifluoride etherate, and the like, either alone or together with an inert organic solvent such as benzene, diethyl ether or the like, at a temperature ranging from about 0° C. to about 80° C., and preferably at room temperature (about 25° C.), for from about 5 minutes to about 48 hours.

The novel 17β-tetrahydrofuranyloxy steroids of the present invention can be administered in any of a number of conventional pharmaceutical forms, and particularly in ones suited for oral administration, e.g., in solid form, such as in pills, powders, capsules, tablets, or the like, or in liquid form, as syrups, emulsions, suspensions, and the like.

In order that those skilled in the art can more fully understand the present invention, the following examples are set forth. These examples are given solely for the purpose of illustrating the invention, and should not be considered as expressing limitations unless so set forth in the appended claims.

PREPARATION A

A solution of 8.5 grams of 1-chloro-2-fluoroethylene in 50 cc. of anhydrous diethyl ether was added dropwise over a half hour period, with stirring, to 15 cc. of a 1.4N solution of methyl lithium in anhydrous diethyl ether, contained under an inert nitrogen atmosphere, and this mixture was then held at room temperature, with stirring, for an additional 90 minutes. Next, a solution of 0.5 gram of $\Delta^5$-androsten-3$\beta$-ol-17-one in 20 cc. of anhydrous diethyl ether was added dropwise, with stirring, over a 15 minute period, following which the resulting reaction mixture was poured into water and extracted with diethyl ether. The combined ether extracts were then washed with water, dried over anhydrous sodium sulfate and concentrated under vacuum. Chromatography of the resulting residue on basic alumina, using petroleum ether/ diethyl ether (8:2, respectively, by volume), as the eluant, followed by crystallization from acid-free methanol, gave 17$\alpha$-fluoroethynyl-$\Delta^5$-androstene-3$\beta$,17$\beta$-diol.

By repeating this procedure using 1,2-dichloroethylene and 1,2-dibromoethylene, respectively, in place of 1-chloro-2-fluoroethylene,
17$\alpha$-chloroethynyl-$\Delta^5$-androstene-3$\beta$,17$\beta$-diol and
17$\alpha$-bromoethynyl-$\Delta^5$-androstene-3$\beta$,17$\beta$-diol were obtained.

Similarly, by replacing $\Delta^5$-androsten-3$\beta$,-ol-17-one with 19-nor-$\Delta^{5(10)}$-androsten-3$\beta$-ol-17-one and using in turn each of the three 1,2-dihaloethylenes mentioned above, 17$\alpha$-fluoroethynyl-19-nor-$\Delta^{5(10)}$-androstene-3$\beta$,17$\beta$-diol;
17$\alpha$-chloroethynyl-19-nor-$\Delta^{5(10)}$-androstene-3$\beta$,17$\beta$-diol and
17$\alpha$-bromoethynyl-19-nor-$\Delta^{5(10)}$-androstene-3$\beta$,17$\beta$-diol, respectively, were obtained.

PREPARATION B

A solution of 1 gram of ethylmagnesium bromide in 50 cc. of tetrahydrofuran was admixed with a solution of 6 grams of trifluoromethyl acetylene in 200 cc. of anhydrous diethyl ether, and the resulting mixture was allowed to stand at room temperature, with stirring, for 18 hours. Next, a solution of 1 gram of $\Delta^5$-androsten-3$\beta$-ol-17-one in 50 cc. of anhydrous tetrahydrofuran was added, and the resulting reaction mixture was allowed to stand at room temperature, with stirring, for an additional 18 hours. Following this reaction period the reaction mixture was poured into a saturated aqueous solution of ammonium chloride and then extracted with diethyl ether. The thus-obtained extract was washed with water until neutral, then dried over anhydrous sodium sulfate and evaporated to dryness. Recrystallization of the resulting residue from acetone/diethyl ether gave 17$\alpha$-trifluoropropynyl-$\Delta^5$-androstene-3$\beta$,17$\beta$-diol.

By repeating this procedure using 19-nor-$\Delta^{5(10)}$-androsten-3$\beta$-ol-17-one as the steroid starting material, 17$\alpha$-trifluoropropynyl-19-nor-$\Delta^{5(10)}$-androsten-3$\beta$,17$\beta$-diol was obtained.

PREPARATION C

A solution of 1 gram of 17$\alpha$-fluoroethynyl-$\Delta^5$-androstene-3$\beta$,17$\beta$-diol in a mixture of 80 cc. of toluene and 20 cc. of cyclohexanone was dried by distilling off 10 cc. of the solvent mixture. Next, a solution of 1 gram of anhydrous aluminum isopropoxide in 7 cc. of anhydrous toluene was added, and the resulting reaction mixture was refluxed for 30 minutes. Following this reaction period 4 cc. of acetic acid were added and the solvents were then removed by steam distillation. The product was then extracted several times with ethyl acetate and the organic extract was washed with an aqueous 5% hydrochloric acid solution, then with water, then with an aqueous 10% sodium carbonate solution and finally with water until neutral. The thus-obtained neutral solution was dried over anhydrous sodium sulfate and evaporated to dryness. Crystallization of the resulting residue from acetone/ hexane gave 17$\alpha$-fluoroethynyl-$\Delta^4$-androsten-17$\beta$-ol-3-one.

This procedure was then repeated in every detail but one, namely,

17$\alpha$-chloroethynyl-$\Delta^5$-androstene-3$\beta$,17$\beta$-diol,
17$\alpha$-bromoethynyl-$\Delta^5$-androstene-3$\beta$,17$\beta$-diol and
17$\alpha$-trifluoropropynyl-$\Delta^5$-androstene-3$\beta$,17$\beta$-diol were used as the steroid starting materials. In each case, the corresponding $\Delta^4$-3-one, namely, 17$\alpha$-chloroethynyl-$\Delta^4$-androsten-17$\beta$-ol-3-one;
17$\alpha$-bromoethynyl-$\Delta^4$-androsten-17$\beta$-ol-3-one and
17$\alpha$-trifluoropropynyl-$\Delta^4$-androsten-17$\beta$-ol-3-one, respectively, were obtained.

PREPARATION D

A solution of 1 gram of 17$\alpha$-fluoroethynyl-19-nor $\Delta^{5(10)}$-androstene-3$\beta$,17$\beta$-diol in 20 cc. of pyridine was admixed with 1 gram of chromium trioxide in 20 cc. of pyridine, and the resulting reaction mixture was allowed to stand at room temperature overnight. Following this reaction period the reaction mixture was diluted with ethyl acetate, then filtered through Celite. The filtrate was then thoroughly washed with water, dried over anhydrous sodium sulfate and evaporated to dryness. Crystallization from acetone/hexane gave 17$\alpha$-fluoroethynyl-$\Delta^{5(10)}$-androsten-17$\beta$-ol-3-one.

By repeating this procedure using

17$\alpha$-chloroethynyl-19-nor-$\Delta^{5(10)}$-androstene-3$\beta$,17$\beta$-diol;
17$\alpha$-bromoethynyl-19-nor-$\Delta^{5(10)}$-androstene-3$\beta$,17$\beta$-diol and
17$\alpha$-trifluoropropynyl-19-nor-$\Delta^{5(10)}$ 1androstene-3$\beta$,17$\beta$-diol as the steroid starting materials, 17$\alpha$-chloroethynyl-19-nor-$\Delta^{5(10)}$-androsten-17$\beta$-ol-3-one;
17$\alpha$-bromoethynyl-19-nor-$\Delta^{5(10)}$-androsten-17$\beta$-ol-3-one and
17$\alpha$-trifluoropropynyl-19-nor-$\Delta^{5(10)}$-androsten-17$\beta$-ol-3-one, respectively, were obtained.

PREPARATION E

A solution of 0.7 gram of 17$\alpha$-fluoroethynyl-19-nor-$\Delta^{5(10)}$-androsten-17$\beta$-ol-3-one in 50 cc. of methanol was admixed with 0.1 cc. of concentrated hydrochloric acid, and the resulting reaction mixture was allowed to stand at room temperature overnight. Following this reaction period the reaction mixture was diluted with water and extracted with methylene dichloride. The thus-obtained extract was then washed with water until neutral, then dried over anhydrous sodium sulfate and evaporated to dryness. Crystallization of the resulting residue from acetone/hexane gave 17$\alpha$-fluoroethynyl-19-nor-$\Delta^4$-androsten-17$\beta$-ol-3-one.

By repeating this procedure using the remaining 19-nor-$\Delta^{5(10)}$-17$\beta$-ol-3-ones obtained as described in Preparation D hereinabove as the steroid starting materials, 17$\alpha$-chloroethynyl-19-nor-$\Delta^4$-androsten-17$\beta$-ol-3-one;
17$\alpha$-bromoethynyl-19-nor-$\Delta^4$-androsten-17$\beta$-ol-3-one and
17$\alpha$-trifluoropropynyl-19-nor-$\Delta^4$-androsten-17$\beta$-ol-3one, respectively, were obtained.

PREPARATION F

A mixture of 500 mg. of testosterone in 10 cc. of dioxane and 350 mg. of 2,3-dichloro-5,6-dicyano-1,4-benzoquinone was refluxed for 10 hours. Following this reaction period the reaction mixture was cooled to room temperature and then filtered to remove the 2,3-dichloro-5,6-dicyano-1,4-benzohydroquinone formed during the reaction. Next, the filtrate was evaporated to dryness and the resulting residue was dissolved in acetone and filtered through alumina to remove the remaining benzohydroquinone. The benzohydroquinone-free filtrate was then evaporated to dryness. Crystallization of the thus-obtained residue from acetone/hexane gave $\Delta^{1,4}$-androstadiene-17$\beta$-ol-3-one.

By repeating this procedure using

17$\alpha$-methyl-$\Delta^4$-androsten-17$\beta$-ol-3-one,
17$\alpha$-vinyl-$\Delta^4$-androsten-17$\beta$-ol-3-one,
17$\alpha$-ethynyl-$\Delta^4$-androsten-17$\beta$-ol-3-one,
17$\alpha$-fluoroethynyl-$\Delta^4$-androsten-17$\beta$-ol-3-one,
17$\alpha$-chloroethynyl-$\Delta^4$-androsten-17$\beta$-ol-3-one,
17$\alpha$-bromoethynyl-$\Delta^4$-androsten-17$\beta$-ol-3-one, and
17$\alpha$-trifluoropropynyl-$\Delta^4$-androsten-17$\beta$-ol-3-one, respectively, as the steroid starting materials, the corresponding 1-dehydro steroids, namely, 17$\alpha$-methyl-$\Delta^{1,4}$-androstadien,
17$\alpha$-vinyl-$\Delta^{1,4}$-androstadien-17$\beta$-ol-3-one,
17$\alpha$-ethynyl-$\Delta^{1,4}$-androstadien-17$\beta$-ol-3-one,
17$\alpha$-fluoroethynyl-$\Delta^{1,4}$-androstadien-17$\beta$-ol-3-one,
17$\alpha$-chloroethynyl-$\Delta^{1,4}$-androstadien-17$\beta$-ol-3-one,
17$\alpha$-bromoethynyl-$\Delta^{1,4}$-androstadien-17$\beta$-ol-3-one, and
17$\alpha$-trifluoropropynyl-$\Delta^{1,4}$-androstadien-17$\beta$-ol-3-one, respectively, were obtained.

Example I

To a solution of 1 gram of testosterone in 25 cc. of benzene there was added 4 cc. of dihydrofuran. Next, approximately 5 cc. of the mixture of benzene and dihydrofuran was distilled off to remove moisture, and the remaining mixture was then cooled to room temperature. To the cooled mixture there was then added 0.1 gram of anhydrous p-toluenesulfonic acid, and the resulting reaction mixture was held at room temperature for 12 hours. Following this reaction period the reaction mixture was washed with an aqueous 5% sodium carbonate solution and then with water until neutral, then dried over anhydrous sodium sulfate and evaporated to dryness. The dry residue was then chromatographed by passing it dissolved in hexane, through a column of neutral alumina, thus giving 17$\alpha$ - tetrahydrofuranyloxy - $\Delta^4$-androsten - 3-one (the 17-tetrahydrofuranyl ether of testosterone).

This procedure was then repeated in every detail but one, namely, testosterone was replaced by 17$\alpha$-methyl-$\Delta^4$-androsten-17$\beta$-ol-3-one,
17$\alpha$-vinyl-$\Delta^4$-androsten-17$\beta$-ol-3-one,
17$\alpha$-ethynyl-$\Delta^4$-androsten-17$\beta$-ol-3-one,
17$\alpha$-fluoroethynyl-$\Delta^4$-androsten-17$\beta$-ol-3-one,
17$\alpha$-chloroethynyl-$\Delta^4$-androsten-17$\beta$-ol-3-one,
17$\alpha$-bromoethynyl-$\Delta^4$-androsten-17$\beta$-ol-3-one,
17$\alpha$-trifluoropropynyl-$\Delta^4$-androsten-17$\beta$-ol-3-one,
19-nor-$\Delta^4$-androsten-17$\beta$-ol-3-one,
17$\alpha$-methyl-19-nor-$\Delta^4$-androsten-17$\beta$-ol-3-one,
17$\alpha$-vinyl-19-nor-$\Delta^4$-androsten-17$\beta$-ol-3-one,
17$\alpha$-ethynyl-19-nor-$\Delta^4$-androsten-17$\beta$-ol-3-one,
17$\alpha$-fluoroethynyl-19-nor-$\Delta^4$-androsten-17$\beta$-ol-3-one,
17$\alpha$-chloroethynyl-19-nor-$\Delta^4$-androsten-17$\beta$-ol-3-one,
17$\alpha$-bromoethynyl-19-nor-$\Delta^4$-androsten-17$\beta$-ol-3-one,
17$\alpha$-trifluoropropynyl-19-nor-$\Delta^4$-androsten-17$\beta$-ol-3-one,
$\Delta^{1,4}$-androstadien-17$\beta$-ol-3-one,
17$\alpha$-methyl-$\Delta^{1,4}$-androstadien-17$\beta$-ol-3-one,
17$\alpha$-vinyl-$\Delta^{1,4}$-androstadien-17$\beta$-ol-3-one,
17$\alpha$-ethynyl-$\Delta^{1,4}$-androstadien-17$\beta$-ol-3-one,
17$\alpha$-fluoroethynyl-$\Delta^{1,4}$-androstadien-17$\beta$-ol-3-one,
17$\alpha$-chloroethynyl-$\Delta^{1,4}$-androstadien-17$\beta$-ol-3-one,
17$\alpha$-bromoethynyl-$\Delta^{1,4}$-androstadien-17$\beta$-ol-3-one,
17$\alpha$-trifluoropropynyl-$\Delta^{1,4}$-androstadien-17$\beta$-ol-3-one,
2$\alpha$-methylandrostan-17$\beta$-ol-3-one,
2$\alpha$-methyl-19-nor-androstan-17$\beta$-ol-3-one,
2-methyl-$\Delta^1$-androsten-17$\beta$-ol-3-one,
2-methyl-19-nor-$\Delta^1$-androsten-17$\beta$-ol-3-one,
2-oxaandrostan-17$\beta$-ol-3-one,
19-nor-2-oxaandrostan-17$\beta$-ol-3-one,
$\Delta^4$-2-oxaandrosten-17$\beta$-ol-3-one,
19-nor-$\Delta^4$-2-oxaandrosten-17$\beta$-ol-3-one,
17$\beta$-hydroxy-$\Delta^4$-androstene-[3,2c]-pyrazole,
17$\beta$-hydroxy-19-nor-$\Delta^4$-androstene-[3,2c]-pyrazole,
17$\beta$-hydroxy-$\Delta^4$-androsten-[3,2c]-oxazole,
17$\beta$-hydroxy-19-nor-$\Delta^4$-androsten-[3,2c]-oxazole,
17$\beta$-hydroxyandrostan-[2,3d]-isoxazole,
17$\beta$-hydroxy-19-nor-androstan-[2,3d]-isoxazole, respectively. In each case the corresponding 17-tetrahydrofuranyl ether, namely, 17$\alpha$-methyl-17$\beta$-tetrahydrofuranyloxy-$\Delta^4$-androsten-3-one,
17$\alpha$-vinyl-17$\beta$-tetrahydrofuranyloxy-$\Delta^4$-androsten-3-one,
17$\alpha$-ethynyl-17$\beta$-tetrahydrofuranyloxy-$\Delta^4$-androsten-3-one,
17$\alpha$-fluoroethynyl-17$\beta$-tetrahydrofuranyloxy-$\Delta^4$-androsten-3-one,
17$\alpha$-chloroethynyl-17$\beta$-tetrahydrofuranyloxy-$\Delta^4$-androsten-3-one,
17$\alpha$-bromoethynyl-17$\beta$-tetrahydrofuranyloxy-$\Delta^4$-androsten-3-one,
17$\alpha$-trifluoropropynyl-17$\beta$-tetrahydrofuranyloxy-$\Delta^4$-androsten-3-one,
17$\beta$-tetrahydrofuranyloxy-19-nor-$\Delta^4$-androsten-3-one,
17$\alpha$-methyl-17$\beta$-tetrahydrofuranyloxy-19-nor-$\Delta^4$-androsten-3-one,
17$\alpha$-vinyl-17$\beta$-tetrahydrofuranyloxy-19-nor-$\Delta^4$-androsten-3-one,
17$\alpha$-ethynyl-17$\beta$-tetrahydrofuranyloxy-19-nor-$\Delta^4$-androsten-3-one,
17$\alpha$-fluoroethynyl-17$\beta$-tetrahydrofuranyloxy-19-nor-$\Delta^4$-androsten-3-one,
17$\alpha$-chloroethynyl-17$\beta$-tetrahydrofuranyloxy-19-nor-$\Delta^4$-androsten-3-one,
17$\alpha$-bromoethynyl-17$\beta$-tetrahydrofuranyloxy-19-nor-$\Delta^4$-androsten-3-one,
17$\alpha$-trifluoropropynyl-17$\beta$-tetrahydrofuranyloxy-19-nor-$\Delta^4$-androsten-3-one,
17$\beta$-tetrahydrofuranyloxy-$\Delta^{1,4}$-androstadien-3-one,
17$\alpha$-methyl-17$\beta$-tetrahydrofuranyloxy-$\Delta^{1,4}$-androstadien-3-one,
17$\alpha$-vinyl-17$\beta$-tetrahydrofuranyloxy-$\Delta^{1,4}$-androstadien-3-one,
17$\alpha$-ethynyl-17$\beta$-tetrahydrofuranyloxy-$\Delta^{1,4}$-androstadien-3-one,
17$\alpha$-fluoroethynyl-17$\beta$-tetrahydrofuranyloxy-$\Delta^{1,4}$-androstadien-3-one,
17$\alpha$-chloroethynyl-17$\beta$-tetrahydrofuranyloxy-$\Delta^{1,4}$-androstadien-3-one,
17$\alpha$-bromoethynyl-17$\beta$-tetrahydrofuranyloxy-$\Delta^{1,4}$-androstadien-3-one,
17$\alpha$-trifluoropropynyl-17$\beta$-tetrahydrofuranyloxy-$\Delta^{1,4}$-androstadien-3-one,
2$\alpha$-methyl-17$\beta$-tetrahydrofuranyloxyandrostan-3-one,
2$\alpha$-methyl-17$\beta$-tetrahydrofuranyloxy-19-nor-androstan-3-one,
2-methyl-17$\beta$-tetrahydrofuranyloxy-$\Delta^1$-androsten-3-one,
2-methyl-17$\beta$-tetrahydrofuranyloxy-19-nor-$\Delta^1$-androsten-3-one,
17$\beta$-tetrahydrofuranyloxy-2-oxaandrostan-3-one,
17$\beta$-tetrahydrofuranyloxy-19-nor-2-oxaandrostan-3-one,
17$\beta$-tetrahydrofuranyloxy-$\Delta^4$-2-oxaandrostan-3-one,
17$\beta$-tetrahydrofuranyloxy-19-nor-$\Delta^4$-2-oxaandrostan-3-one,
17$\beta$-tetrahydrofuranyloxy-$\Delta^4$-androstene-[3,2c]-pyrazole, 17β-tetrahydrofuranyloxy-19-nor-Δ⁴-androstene-[3,2c]-
pyrazole,
17β-tetrahydrofuranyloxy-Δ⁴-androsten-[3,2c]-oxazole,
17β-tetrahydrofuranyloxy-19-nor-Δ⁴-androsten-[3,2c]-
oxazole,
17β-tetrahydrofuranyloxyandrostan-[2,3d]-isoxazole,
17β-tetrahydrofuranyloxy-19-nor-androstan-[2,3d]-
isoxazole,
17β-tetrahydrofuranyloxy-Δ⁴-androsten-2,3d-isoxazole,
and
17β-tetrahydrofuranyloxy-19-nor-Δ⁴-androsten-2,3d-
isoxazole, respectively, were obtained.

*Example II*

The procedure of Example I was again repeated in every detail except for the following. 20 mg. of anhydrous p-toluenesulfonic acid were employed rather than 0.1 gram, the reaction was carried out for 15 minutes at room temperature, and 19-nor-Δ⁵⁽¹⁰⁾-androsten-17β-ol-3-one,
17α-methyl-19-nor-Δ⁵⁽¹⁰⁾-androsten-17β-ol-3-one,
17α-vinyl-19-nor-Δ⁵⁽¹⁰⁾-androsten-17β-ol-3-one,
17α-ethynyl-19-nor-Δ⁵⁽¹⁰⁾-androsten-17β-ol-3-one,
17α-fluoroethynyl-19-nor-Δ⁵⁽¹⁰⁾-androsten-17β-ol-3-one,
17α-chloroethynyl-19-nor-Δ⁵⁽¹⁰⁾-androsten-17β-ol-3-one,
17α-bromoethynyl-19-nor-Δ⁵⁽¹⁰⁾-androsten-17β-ol-3-
one, and
17α-trifluoropropynyl-19-nor-Δ⁵⁽¹⁰⁾-androsten-17β-ol-3-
one, respectively, were used as the steroids starting materials. In each case, the corresponding 17-tetrahydrofuranyl ether, namely, 17β-tetrahydrfuranyloxy-19-nor-Δ⁵⁽¹⁰⁾-androsten-3-one,
17α-methyl-17β-tetrahydrofuranyloxyl-19-nor-Δ⁵⁽¹⁰⁾-
androsten-3-one,
17α-vinyl-17β-tetrahydrofuranyloxy-19-nor-Δ⁵⁽¹⁰⁾-
androsten-3-one,
17α-ethynyl-17β-tetrahydrofuranyloxy-19-nor-Δ⁵⁽¹⁰⁾-
androsten-3-one,
17α-fluoroethynyl-17β-tetrahydrofuranyloxy-19-nor-Δ⁵⁽¹⁰⁾-
androsten-3-one,
17α-chloroethynyl-17β-tetrahydrofuranyloxy-19-nor-
Δ⁵⁽¹⁰⁾-androsten-3-one,
17α-bromoethynyl-17β-tetrahydrofurfanyloxy-19-nor-
Δ⁵⁽¹⁰⁾-androsten-3-one, and
17α-trifluoropropynyl-17β-tetrahydrofuranyloxy-19-nor-
Δ⁵⁽¹⁰⁾-androsten-3-one, respectively, was obtained.

It will be obvious to those skilled in the art that other changes and variations can be made in carrying out the present invention without departing from the spirit and scope thereof as defined in the appended claims.

I claim:

1. A compound of the formula:

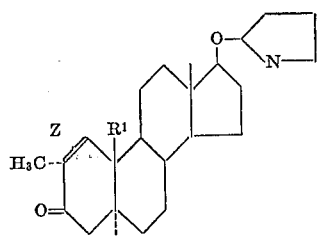

wherein Z is selected from the group consisting of a saturated linkage and a double bond; $R^1$ is selected from the group consisting of hydrogen and methyl, and when Z represents a double bond, $R^1$ is methyl.

2. 2α-methyl-17β-tetrahydrofuranyloxyandrostan-3-one.
3. 2α-methyl-17β-tetrahydrofuranyloxy - 19 - nor-androstan-3-one.
4. 2 - methyl-17β-tetrahydrofuranyloxy-Δ¹-androsten-3-one.
5. 2 - methyl-17β-tetrahydrofuranyloxy-19-nor-Δ¹-androsten-3-one.
6. A compound of the formula:

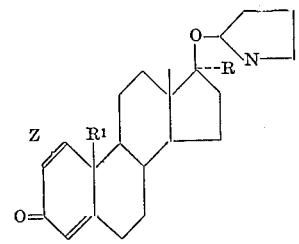

wherein Z is selected from the group consisting of a saturated linkage and a double bond; $R^1$ is selected from the group consisting of hydrogen and methyl, and when Z represents a double bond, $R^1$ is methyl, and R is selected from the group consisting of hydrogen, a lower alkyl group, a lower alkenyl group and a lower alkynyl group.

7. 17β-tetrahydrofuranyloxy-Δ⁴-androsten-3-one.
8. 17α-ethynyl-17β-tetrahydrofuranyloxy-Δ⁴-androsten-3-one.
9. 17β - tetrahydrofuranyloxy-19-nor-Δ⁴-androsten-3-one.
10. 17α - ethynyl-17β-tetrahydrofuranyloxy-19-nor-Δ⁴-androsten-3-one.
11. 17β-tetrahydrofuranyloxy-Δ¹,⁴-androstadien-3-one.
12. 17α-ethynyl - 17β - tetrahydrofuranyloxy-Δ¹,⁴-androstadien-3-one.
13. A compound of the formula

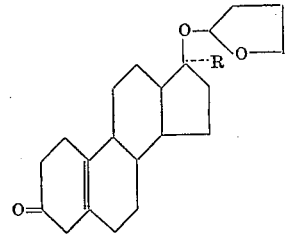

wherein R is selected from the group consisting of hydrogen, a lower alkyl group, a lower alkenyl group and a lower alkynyl group.

14. 17β - tetrahydrofuranyloxy - 19 - nor - Δ⁵⁽¹⁰⁾-androsten-3-one.
15. 17α - ethynyl - 17β - tetrahydrofuranyloxy - 19-nor-Δ⁵⁽¹⁰⁾-androsten-3-one.
16. A compound of the formula

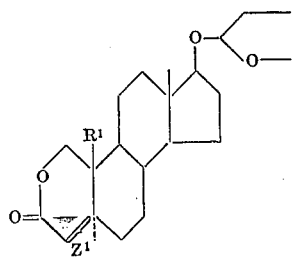

wherein $Z^1$ is selected from the group consisting of a saturated linkage and a double bond and $R^1$ is selected from the group consisting of hydrogen and methyl.

17. 17β - tetrahydrofuranyloxy - 2 - oxoandrostan - 3-one.
18. 17β - tetrahydrofuranyloxy - Δ⁴ - 2 - oxoandrosten-3-one.

19. A compound of the formula

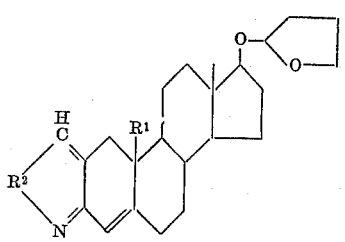

wherein R¹ is selected from the group consisting of hydrogen and methyl and R² is selected from the group consisting of —O— and

20. 17β - tetrahydrofuranyloxy - Δ⁴ - androsten - 3,2c-pyrazole.

21. 17β - tetrahydrofuranyloxy - Δ⁴ - androsten - 3,2c-oxazole.

22. A compound of the formula

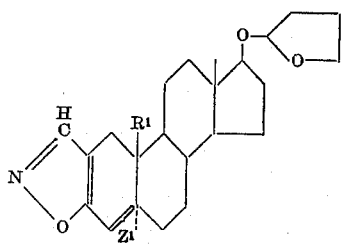

wherein Z¹ is selected from the group consisting of a saturated linkage and a double bond and R¹ is selected from the group consisting of hydrogen and methyl.

23. 17β - tetrahydrofuranyloxyandrostan - 2,3d - isoxazole.

24. 17β - tetrahydrofuranyloxy - Δ⁴ - androsten - 2,3d-isoxazole.

No references cited.

LEWIS GOTTS, *Primary Examiner.*

ELBERT L. ROBERTS, *Examiner.*

HENRY A. FRENCH, *Assistant Examiner.*

UNITED STATES PATENT OFFICE
CERTIFICATE OF CORRECTION

Patent No. 3,341,527　　　　　　　　　　　　　　September 12, 1967

Alexander D. Cross

It is hereby certified that error appears in the above numbered patent requiring correction and that the said Letters Patent should read as corrected below.

Column 7, lines 56 to 65, the formula should appear as shown below instead of as in the patent:

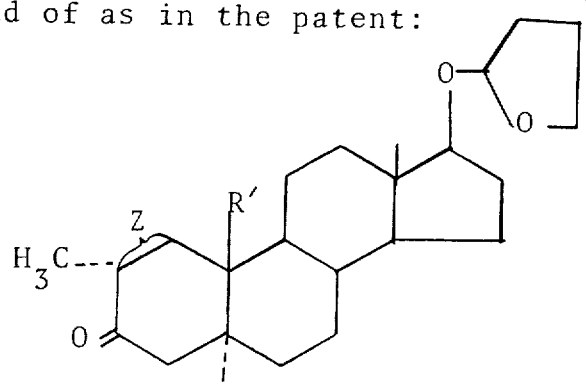

column 8, lines 5 to 15, the formula should appear as shown below instead of as in the patent:

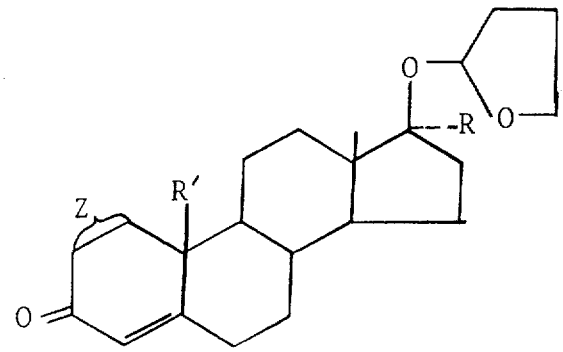

Signed and sealed this 12th day of November 1968.

(SEAL)
Attest:

EDWARD M. FLETCHER, JR.　　　　　　　　　EDWARD J. BRENNER
Attesting Officer　　　　　　　　　　　　Commissioner of Patents